United States Patent [19]

Suzuki et al.

[11] Patent Number: 4,740,421

[45] Date of Patent: Apr. 26, 1988

[54] POLYPROPYLENE COMPOSITE STRETCHED FILM

[75] Inventors: Takeshi Suzuki; Nobutoshi Komori, both of Ichihara, Japan

[73] Assignee: Chisso Corporation, Ohsaka, Japan

[21] Appl. No.: 946,137

[22] Filed: Dec. 22, 1986

Related U.S. Application Data

[63] Continuation of Ser. No. 611,760, May 18, 1984, abandoned.

[30] Foreign Application Priority Data

May 18, 1983 [JP] Japan .................................. 58-87101

[51] Int. Cl.$^4$ .............................................. B32B 27/00
[52] U.S. Cl. ................................... 428/349; 428/500; 428/516; 428/910; 526/348.1
[58] Field of Search ............... 428/515, 349, 516, 910; 526/348.1

[56] References Cited

U.S. PATENT DOCUMENTS

| | | | |
|---|---|---|---|
| 4,125,662 | 11/1978 | Weiner et al. | 428/349 |
| 4,294,889 | 10/1981 | Hashimoto | 428/515 |
| 4,297,415 | 10/1981 | Ward et al. | 428/516 |
| 4,302,504 | 11/1981 | Lansbury et al. | 428/349 |
| 4,303,708 | 12/1981 | Gebhardt et al. | 428/349 |
| 4,339,498 | 7/1982 | Weiner | 428/349 |
| 4,340,641 | 7/1982 | Weiner | 428/349 |
| 4,380,567 | 4/1983 | Shigemoto | 428/349 |
| 4,384,024 | 5/1983 | Mitchell et al. | 428/349 |
| 4,410,672 | 10/1983 | Inazawa | 526/348.6 |

FOREIGN PATENT DOCUMENTS

| | | | |
|---|---|---|---|
| 145713 | 11/1980 | Japan | 428/349 |
| 205411 | 12/1982 | Japan . | |
| 2027720 | 6/1979 | United Kingdom . | |

*Primary Examiner*—Edith Buffalow
*Attorney, Agent, or Firm*—Fay, Sharpe, Beall, Fagan, Minnich & McKee

[57] ABSTRACT

A polypropylene composite stretched film having superior low-temperature heat-sealing characteristics, transparency and anti-block properties is provided, which film comprises as a base layer, a crystalline polypropylene and as a heat-sealing layer, a crystalline ethylene-propylene random copolymer containing 1 to 5% by weight of polymers having a molecular weight (Mw) of 6,000 or less and 3 to 5% by weight of ethylene, or a crystalline ethylene-propylene-butene-1 copolymer containing 1 to 5% by weight of polymers having a Mw of 6,000 or less, 1 to 10% by weight of ethylene and 4 to 30% by weight of butene-1.

8 Claims, No Drawings

POLYPROPYLENE COMPOSITE STRETCHED FILM

This application is a continuation of application Ser. No. 611,760 filed on May 18, 1984, now abandoned.

BACKGROUND OF THE INVENTION

1. Field of the Invention

This invention relates to polypropylene composite stretched films having superior low-temperature heat-sealing characteristics, transparency and anti-block properties.

2. Description of the Prior Art

Crystalline polypropylene films, particularly, biaxially stretched polypropylene films, have superior characteristics in mechanical properties such as tensile strength, impact strength, modulus of elasticity, surface hardness, cold temperature resistance, etc., and optical properties such as gloss, transparency, etc. and further, odorless properties, non-toxic properties, etc.; hence they have been broadly used in the field of food packaging. However, biaxially stretched polypropylene films themselves have high heat-sealing temperatures, which results in such drawbacks that when they are subjected to heat seal at such temperatures, a large heat shrinkage occurs to reduce their sealing strength and spoil their fine appearance.

In order to overcome such drawbacks, films having a readily heat-sealable, low-melting resin laminated onto a biaxially stretched polypropylene film as a base have been broadly used. Lamination processes therefor include a process of coating a base layer with a low-melting resin in solution or in molten state, a process of laminating a film-forming low-melting resin onto a base by heating or with an adhesive, and the like processes. Further, a process has been noted in view of its high productivity, which process comprises laminating a low-melting resin onto an unstretched polypropylene film or molding a crystalline polypropylene and a low-melting resin into a film according to a co-extrusion process, followed by monoaxial or biaxial stretching. In general, when a low-melting resin of a laminated film is monoaxially or biaxially oriented, it has a higher softening point than that in the case of non-orientation and its heat-sealing temperature also becomes higher. Thus, according to the process of stretching after lamination, it is desirable to subject the stretching temperature to the melting point of the low melting component or higher to thereby keep the low-melting component at a non-oriented or nearly non-oriented state.

For the low-melting component laminated onto the biaxially stretched polypropylene film, it is desired that (i) it has a heat-sealing temperature lower than the heat shrinkage temperature of the biaxially stretched polypropylene film as the base, (ii) a high heat-sealing strength, (iii) a good adhesion to the base, and besides, (iv) a transparency to the same extent as or higher than that of the base, (v) a superior anti-block property and (vi) scratch resistance and it is non-toxic and odorless. Polyethylene and ethylene-vinyl acetate copolymers so far often used as a low-melting component are superior in heat-sealing properties but insufficient in transparency, scratch resistance and anti-block properties. On the other hand, a number of proposals of propylene copolymers having a small amount of a comonomer such as ethylene, butene-1, etc., copolymerized have been disclosed, for example, in Japanese patent publication Nos. 46-31478/1971, 49-14343/1974 and 52-30434/1978 and Japanese patent application laid-open Nos. 53-114887/1978 and 55-17542/1980. However, composite stretched films provided with all the above characteristic (i)-(vi) have not yet been obtained. Further, the above Japanese patent application laid-open No. 55-17542/1980 discloses use of crystalline propylene-α-olefin-ethylene copolymers containing 15% by weight or less of cold xylene-soluble matter, as a heat-sealing layer, but this is not economical since it is necessary for obtaining such copolymers to remove the cold xylene-soluble matter by washing the copolymers with a hydrocarbon such as liquefied propylene, n-heptane, etc.

In order to overcome these drawbacks, the present inventors have made extensive research, and as a result, have found that in propylene random copolymers as a heat-sealing layer having ethylene or ethylene and butene-1 as comonomer(s) copolymerized therein, the content of polymers having a molecular weight (abbreviated to Mw) of 6,000 or less in the copolymers is a dominating factor in the above characteristics. Further, it has been found that if the content of polymers having a Mw of 6,000 or less is in the range of 1 to 5% by weight, a good heat-sealing layer is obtained even when the content of cold xylene-soluble matter exceeds 15% by weight, and also that if the content of polymers having a Mw of 6,000 or less exceeds 5% by weight, the anti-block properties of the copolymers becomes inferior even when the content of cold xylene-soluble matter is 15% by weight or less.

SUMMARY OF THE INVENTION

The present invention resides in;

a polypropylene composite stretched film comprising a base layer consisting of a crystalline polypropylene and a heat-sealing layer consisting of a crystalline ethylene-propylene random copolymer containing 1 to 5% by weight of polymers having a molecular weight (Mw) of 6,000 or less and 3 to 15% by weight of ethylene, each based on the weight of the copolymer, or a crystalline ethylene-propylene-butene-1 random copolymer containing 1 to 5% by weight of polymers having a Mw of 6,000 or less, 1 to 10% by weight of ethylene and 4 to 30% by weight of butene-1, each based on the weight of the copolymer.

DESCRIPTION OF THE PREFERRED EMBODIMENTS

The crystalline polypropylene used as the base layer in the present invention has a density of 0.89 to $0.92/cm^3$, a melt flow rate (hereinafter abbreviated to MFR) of 0.1 to 10 and an isotactics index (boiling n-heptane-insoluble) of 75 to 98%, that is, may be so far known as crystalline polypropylene, and is substantially propylene homopolymer.

In the case where the heat-sealing layer in the present invention is an ethylene-propylene random copolymer, this copolymer has an ethylene content of 3 to 15% by weight, preferably 5 to 11% by weight, and a content of low molecular weight polymers having a Mw of 6,000 or less, of 1 to 5% by weight, preferably 1 to 4% by weight, and its MFR has no particular limitation, but copolymers having a MFR of 1 to 50 may usually be preferably used. If the ethylene content of this random copolymer is lower than 3% by weight, lowering in the heat-sealing temperature is insufficient, and if it exceeds 15% by weight, the anti-block properties, scratch resistance and transparency of the copolymer not only become inferior, but also reduction in the heat-sealing temperature is small for the lowered melting point. Further, if the content of the low molecular weight polymers having a Mw of 6,000 or less is less than 1% by weight, lowering in the heat-sealing temperature is insufficient even when the ethylene content is 3% by weight or more, and transparency is also inferior. If the content of the low molecular weight polymers exceeds 5% by weight, the anti-block properties, scratch resistance and transparency not only become inferior, but also lowering in the heat-sealing temperature is small for the lowered melting point.

In the case where the heat-sealing layer in the present invention is an ethylene-propylene-butene-1 random copolymer, its ethylene content is in the range of 1 to 10% by weight, its butene-1 content is in the range of 4 to 30% by weight and the content of low molecular weight polymers having a Mw of 6,000 or less is in the range of 1 to 5% by weight, preferably 1 to 4% by weight, and its MFR has no particular limitation, but usually it is preferably in the range of 1 to 50. If the ethylene content of the random copolymer is less than 1% by weight or the butene-1 content thereof is less than 4% by weight, lowering in the heat-sealing temperature is insufficient, and if the ethylene content exceeds 10% by weight or the butene-1 content exceeds 30% by weight, the anti-block properties, scratch resistance and transparency not only become inferior, but also lowering in the heat-sealing temperature is small for the lowered melting point. Further, the content of low molecular weight polymers having a Mw of 6,000 or less is less than 1% by weight, reduction in the heat-sealing temperature is insufficient even when the respective contents of ethylene and butene-1 are in the above-mentioned ranges, and transparency is inferior, and if the content of the low molecular weight polymers exceeds 5% by weight, the anti-block properties, scratch resistance and transparency not only become inferior, but also lowering in the heat-sealing temperature is small for the lowered melting point.

The above ethylene-propylene random copolymer and ethylene-propylene-butane-1 random copolymer used as the heat-sealing layer in the present invention may be obtained by polymerizing a mixture of propylene and ethylene or propylene, ethylene and butene-1 in the presence of a polymerization catalyst obtained by reacting $TiCl_4$, an organoaluminum compound and an ether compound, successively treating the resulting reaction product with $TiCl_4$ and an ether compound or a reaction product of $TiCl_4$ with an ether compound and combining the resulting titanium containing composition with an organoaluminum (preferably diethylaluminum chloride), or a polymerization catalyst obtained by subjecting $TiCl_4$ to contact-treatment with a magnesium compound and an electron donor compound or the like and combining the resulting titanium containing composition with an organoaluminum compound (preferably a trialkylaluminum compound) and an electron donor compound. Examples of the above-mentioned titanium trichloride composition are titanium trichloride compositions A, B, C and D disclosed in Japanese patent application laid-open No. 57-205411/1982. The polymerization process for preparing the copolymer may be either of liquid phase process (slurry process or solution process) or gas phase process, but in the case of liquid phase process, lower molecular weight components are liable to be lost due to escape; thus gas phase process is commercially preferred. Further, it is also possible to obtain both random copolymers by mixing a random copolymer composed mainly of propylene with lower molecular weight polymers so that the respective contents of the lower molecular weight copolymer components and the copolymer component may fall within a determined range.

The polypropylene composite stretched film of the present invention has a structure wherein onto one surface or both the surfaces of a biaxially stretched polypropylene film as a base layer is laminated ethylene-propylene random copolymer or ethylene-propylene-butane-1 random copolymer according to the present invention containing a small amount of lower molecular weight polymers, as a heat-sealing layer. As for the lamination process, it is possible to employ any of known lamination processes such as the above-mentioned application process, extrusion-coating process, dry laminate process, co-extrusion process, etc., and the stretching step may be carried out either before or after the lamination process. The respective thicknesses of the base layer and the heat-sealing layer of the polypropylene composite stretched film of the present invention have no particular limitation, but when the film is applied to packaging uses for foods, clothes, etc., the base layer has a thickness in the range of 5 to 200 microns, preferable 10 to 60 microns and the heat-sealing layer has a thickness in the range of 2 to 100 microns, preferably 3 to 30 microns.

As for the base layer and the heat-sealing layer, it is possible to add various additions usually employed for polypropylene films such as stabilizer, slipping agent, antistatic agent, pigment, filler, etc., within a range in which the object of the present invention is not harmed.

The present invention will be further described by way of Examples. In addition, methods for measuring various physical properties employed in Examples will be collectively described below.

(1) Ethylene and butene-1 contents in the copolymer: according to infrared spectrophotometry and $C^{13}$ NMR method.

(2) MFR: according to ASTM D 1238-73, at 230° C.

(3) Content of low molecular weight polymers having a Mw of 6,000 or less: measured by extracting the copolymer with boiling n-pentane for 6 hours, and analyzing the resulting n-pentane soluble matter according to Gel Permeation Chromatography to determine the amount of low molecular weight polymers having a Mw of 6,000 or less, relative to the raw material sample.

(4) Melting point: temperature at which the maximum value of endothermic curve according to differential scanning calorimeter (DSC) is exhibited.

(5) Heat of fusion: determined from the area of the endothermic curve according to DSC; at that time, the curve on the side of the completely molten state was extrapolated to that on the lower temperature side to obtain the base line.

(6) Haze: according to ASTM D 1003.

(7) Blocking: two pieces of the composite film having a width of 2 cm were placed on one another so that the heat-sealing layers might be contacted with one another; and a weight of 500 g having a bottom surface of a square of 2 cm×2 cm was placed on the resulting material, which was then pressed at 40° C. for 24 hours, followed by measuring its tensile shear strength at a rate of pulling of 50 mm/min.

(8) Heat-sealing strength: two pieces of the polypropylene composite stretched film were placed on one another so that the heat-sealing layers might be contacted with one another, followed by adhering them together under press at a pressure of 2 Kg/cm² for 0.8 second at a prescribed temperature and then subjecting the resulting sample of 15 mm wide to peeling at a peel rate of 200 mm/min. and at a peel angle of 180°, to measure peel resistance.

(9) Cold xylene-soluble matter (CXS): 5 g of a sample polymer was dissolved in 500 ml of boiling xylene, followed by allowing the solution to stand at 20° C. for 4 hours, filtering off the deposited polymer, vaporizing xylene from the filtrate and drying the residue under reduced pressure to recover a cold-xylene-soluble polymer; the captioned matter being expressed by the percentage of the recovered polymer relative to the sample polymer.

EXAMPLE 1

Preparation of titanium containing composition (A)

The inside of a 15 l capacity reactor equipped with a stirrer (200 rpm) was kept under nitrogen atmosphere followed by feeding therein n-hexane (2.7 l) and TiCl₄ (0.69 l), cooling the mixture to 0° C., adding n-hexane (3.4 l) and diethylaluminum chloride (hereinafter abbreviated to DEAC)(0.78 l) at 0° C. over 4 hours, thereafter stirring the mixture for one hour, further stirring at 65° C. for one hour to react the mixture, cooling the reaction material down to room temperature, allowing it to stand still, separating the liquid phase part as an upper layer, five times washing solids as a precipitated layer with hexane, agitating the solids together with hexane (9.8 l) and diisoamyl ether (1.37 l) at 35° C. for 100 minutes, allowing the reaction material to stand still, separating off the supernatant, washing the resulting solid product as a remaining precipitated layer with hexane, adding hexane (3.9 l) and TiCl₄(1.0 l) over 60 minutes, stirring 65° C. for 2 hours, allowing the reaction material to stand still, removing the supernatant, washing the resulting precipitate with hexane, and drying it under reduced pressure to obtain a titanium containing composition (1 Kg).

The composition corresponds to a titanium containing composition (A) disclosed in Japanese patent application laid-open No. 57-205411/1982.

Preparation of copolymer

A horizontal type reactor (L/D=5, capacity 860 l) equipped with agitating blades (60 rpm) was sufficiently dried and its inside was purged by nitrogen gas. Into the reactor were fed a titanium containing composition (A) having an average particle diameter of 20 microns at 20 g/h, DEAC at 50 g/h, methyl methacrylate at 1.1 g/h, and sufficiently purified propylene, ethylene and hydrogen continuously, and carrying out gas phase continuous copolymerization in the presence of this obtained propylene random copolymer powder, under conditions of an ethylene concentration in the gas phase part of 1.5% by mol, hydrogen concentration in the gas phase part of 5.2% by mol, a polymerization pressure of 20 Kg/cm².G, a polymerization temperature of 70° C. and an average retention time of 3 hours.

The polymerization heat generated in the reactor was removed by adding liquefied propylene into the reactor. The gas mixture vaporized in the reactor was withdrawn from the reactor through a recycle gas piping, cooled in a heat exchanger and liquefied. Non-condensed part was fed to the lower part of the powder bed of the reactor. The propylene random copolymer withdrawn from the reactor was sent to a post-treatment step where the catalyst was deactivated in gas phase.

The characteristic values of the thus obtained propylene random copolymer are shown in Table 1.

Molding into polypropylene composite stretched film

A propylene homopolymer containing a boiling n-heptane extraction residue of 96% by weight and having a MFR of 1.8 was extruded into a sheet by means of an extruder equipped with T-die, followed by stretching the sheet in the longitudinal direction at 135° C. through a roll peripheral speed difference so as to give an effective stretch ratio of 5 times to obtain a uniaxially stretched sheet having a thickness of 220 microns. Onto this sheet was laminated the above propylene random copolymer by means of an extrusion laminator so as to give a thickness of 60 microns, followed by stretching the laminate in the lateral direction at 160° C. so as to give an effective stretch ratio of 8 times to obtain a polypropylene composite stretched film. The value of physical properties of this film are shown in Table 2.

EXAMPLE 2

Comparative Examples 1 and 2

Various kinds of propylene random copolymers were obtained in the same manner as in the preparation of propylene random copolymer of Example 1 except that the hydrogen concentration and the ethylene concentration at the gas phase part, the reaction pressure and the reaction temperature were varied. Copolymerization conditions and the physical properties of the resulting propylene random copolymers are shown in Table 1, and the physical properties of composite stretched films produced using the copolymers in the same manner as in Example 1 are shown in Table 2.

EXAMPLES 3–5

Comparative Example 3

Various kinds of random copolymers were obtained in the same manner as in the preparation of the ethylene-propylene-butane-1 random copolymer of Example 1 except that copolymerized components and reaction conditions were varied. Copolymerization conditions and the physical properties of the resulting random copolymers are shown in Table 1, and the physical properties of composite stretched films produced using the copolymers in the same manner as in Example 1 are shown in Table 2.

Comparative Examples 4 and 5

Random copolymerizations were carried out according to slurry method, using the same titanium containing composition as that used in Example 1 and n-hexane as a dispersion medium, followed by deactivating the catalyst with methanol, removing it, filtering and drying to obtain random copolymers. Copolymerization conditions and the physical properties of the resulting random copolymers are shown in Table 1. The concentrations of hydrogen, ethylene and butene-1(% by mol) in Table 1 were measured in the gas phase of the reaction vessel.

The physical properties of composite stretched films produced using the above random copolymers in the same manner as in Example 1 are shown in Table 2.

Comparative Example 6

A random copolymer was obtained in the same manner as in Comparative example 3 except that copolymerization conditions were varied. Copolymerization conditions and the physical properties of the resulting random copolymer are shown in Table 1, and the physical properties of the composite stretched film produced using the copolymer in the same manner as in Example 1 are shown in Table 2.

EXAMPLE 6

A random copolymer was obtained in the same manner as in Example 4 except that copolymerization conditions were varied. Copolymerization conditions and the physical properties of the resulting random copolymer are shown in Table 1, and the physical properties of composite stretched film produced using the copolymer in the same manner as in Example 1 are shown in Table 2.

EXAMPLE 7

A heptane solution (160 l) of n-butyl.ethyl magnesium was introduced into a reactor (capacity: 500 l) equipped with a stirrer followed by heating it to 80° C., gradually adding ethyl benzoate (2 l), adding a mixed solution of heptane (100 l) with $CCl_4$ (25 l), keeping the temperature at 80° C., filtering the resulting deposited product while hot, five times washing it with hexane (100 l), and drying in vacua at room temperature to obtaine the solid product (I). Into a 500 l reactor equipped with a stirrer were fed the solid product (I) (5 Kg) and heptane (200 l), suspending, heating the suspension to 80° C., adding a mixed solution of p-cresol (2.5 Kg) with heptane (100 l), reacting them for 5 hours, filtering the reaction liquid while hot, 5 times washing the resulting precipitate with hexane (100 l), drying it in vacua at room temperature, to obtain a solid product (II) (5 Kg). The solid product (II) (5 Kg) and heptane (200 l) were introduced into a reactor (capacity 500 l), suspending, heating the suspension to 80° C., adding a mixed solution of $TiCl_4$ (30 l) with heptane (100 l) with stirring, keeping the mixture at 80° C. for 5 hours, filtering the resulting deposited solid product (III) while hot, 5 times washing it with hexane (100 l) and drying it in vacua at room temperature to obtaine a titanium containing compositon (E) (about 5 Kg).

A copolymer was prepared in the same manner as in Example 1 except that in the reaction conditions of Example 1, the titanium containing composition (A) was varied to the above titanium containing compositon (E); DEAC, to triisobutylaluminum (1000 m mol/h); methyl metacrylate, to ethyl p-toluate (250 m mol/h); the ethylene concentration at the gas phase part, to 3.8% by mol; the polymerization pressure, to 15 Kg/cm².G; and the average retention time, to one hour, respectively. The physical properties of the thus obtained ethylene-propylene random copolymer were as follows: MFR, 7.5; ethylene content, 7.0% by weight; content of polymers having a Mw of 6000 or less, 1.8% by weight; m.p., 130° C.; and heat of fusion 40 J/g.

A composite stretched film having the above random copolymer as a heat-sealing layer was prepared in the same manner as Example 1. The physical properties of the thus obtained composite stretched film were as follows; haze, 2.5%; blocking, 610 g/4 cm²; and heat-sealing strength (110° C.), 100 g/15 mm.

TABLE 1

| | Example 1 | Example 2 | Compar. ex. 1 | Compar. ex. 2 | Example 3 | Example 4 | Example 5 | Compar. ex. 3 | Compar. ex. 4 | Compar. ex. 5 | Compar. ex. 6 | Example 6 |
|---|---|---|---|---|---|---|---|---|---|---|---|---|
| Copolymerization conditions | | | | | | | | | | | | |
| $TiCl_3$ g/h | 20 | 20 | 20 | 20 | 20 | 20 | 20 | 20 | 20 | 20 | 15 | 20 |
| DEAC g/h | 50 | 50 | 50 | 50 | 50 | 50 | 50 | 50 | 50 | 50 | 25 TEA 15 | 60 |
| MMA g/h | 1.1 | 1.1 | 1.1 | 1.1 | 1.1 | 1.1 | 1.1 | 1.1 | 1.3 | 1.1 | — | 1.4 |
| Pressure Kg/cm² | 20 | 20 | 20 | 18 | 20 | 20 | 20 | 12 | 8 | 20 | 10 | 12 |
| Temperature °C. | 70 | 70 | 70 | 60 | 70 | 70 | 70 | 60 | 55 | 70 | 80 | 60 |
| $H_2$ mol % | 5.2 | 5.8 | 3.5 | 6.9 | 4.5 | 4.0 | 4.8 | 5.6 | 5.2 | 4.5 | 3.0 | 3.5 |
| Ethylene mol % | 1.5 | 2.5 | 0.5 | 4.2 | 1.1 | 0.7 | 1.5 | 3.0 | 3.5 | 3.2 | 1.0 | 1.2 |
| Butene-1 mol % | — | — | — | — | 2.3 | 8.0 | 7.7 | 10.3 | — | 4.1 | 4.8 | 9.2 |
| Physical properties of copolymer | | | | | | | | | | | | |
| MFR g/10 min | 11.3 | 7.8 | 10.5 | 7.2 | 11.5 | 8.4 | 7.5 | 7.2 | 12.1 | 12.0 | 8.5 | 9.2 |
| Ethylene content wt % | 5.4 | 10.9 | 2.0 | 17.2 | 3.5 | 2.5 | 5.2 | 12.1 | 5.6 | 4.0 | 4.0 | 3.5 |
| Butene-1 content wt % | — | — | — | — | 4.5 | 14.9 | 15.2 | 32.4 | — | 4.0 | 8.0 | 18.0 |
| $M_w \leq 6000$ content wt % | 2.3 | 4.0 | 0.9 | 7.1 | 1.6 | 1.2 | 2.7 | 8.5 | 0.1 | 0.2 | 7 (14)*² | 2.0 (20)*² |
| m.p. °C. | 140 | 103 | 154 | *¹ | 137 | 110 | 92 | *¹ | 138 | 135 | 118 | 90 |
| Heat of fusion J/g | 53 | 17 | 87 | *¹ | 103 | 53 | 40 | *¹ | 52 | 98 | 47 | 45 |

*¹No clear fusion peak was obtained.
*²C × S %

TABLE 2

| | Example 1 | Example 2 | Compar. ex. 1 | Compar. ex. 2 | Example 3 | Example 4 | Example 5 | Compar. ex. 3 | Compar. ex. 4 | Compar. ex. 5 | Compar. ex. 6 | Example 6 |
|---|---|---|---|---|---|---|---|---|---|---|---|---|
| Physical properties of film | | | | | | | | | | | | |
| Haze % | 2.0 | 2.5 | 2.2 | 4.2 | 2.1 | 1.9 | 2.0 | 4.6 | 3.5 | 3.4 | 5.6 | 1.8 |
| Blocking g/4 cm² | 630 | 690 | 500 | 1340 | 570 | 620 | 670 | 1730 | 570 | 530 | 1820 | 650 |
| Heat-sealing strength (g/15 mm) | | | | | | | | | | | | |

TABLE 2-continued

| | Example 1 | Example 2 | Compar. ex. 1 | Compar. ex. 2 | Example 3 | Example 4 | Example 5 | Compar. ex. 3 | Compar. ex. 4 | Compar. ex. 5 | Compar. ex. 6 | Example 6 |
|---|---|---|---|---|---|---|---|---|---|---|---|---|
| 100° C. | — | 320 | — | — | — | 170 | 350 | — | — | — | — | 340 |
| 105 | — | 310 | — | — | — | 350 | 310 | — | — | — | — | 330 |
| 110 | 40 | 350 | — | 30 | 40 | 320 | 390 | 31 | 13 | 32 | 80 | 350 |
| 115 | 80 | 340 | — | 70 | 82 | 330 | 320 | 70 | 29 | 60 | 170 | 330 |
| 120 | 170 | 380 | — | 170 | 175 | 370 | 350 | 180 | 75 | 70 | 320 | 360 |
| 125 | 330 | 370 | — | 180 | 320 | 380 | 360 | 320 | 184 | 170 | 340 | 350 |
| 130 | 370 | 320 | 32 | 370 | 370 | 360 | 340 | 370 | 316 | 310 | 360 | 350 |
| 135 | 360 | 350 | 72 | 380 | 370 | 350 | 370 | 370 | 382 | 370 | 350 | 350 |
| 140 | 350 | 340 | 162 | 350 | 330 | 370 | 330 | 360 | 362 | 380 | 340 | 370 |
| 145 | 320 | 380 | 330 | 330 | 340 | 320 | 320 | 320 | 313 | 370 | 330 | 390 |
| 150 | 350 | 320 | 340 | 380 | 320 | 380 | 310 | 340 | 303 | 350 | 370 | 360 |

What we claim is:

1. A polypropylene composite stretched film comprising a base layer consisting essentially of a crystalline polypropylene and a heat sealing layer consisting essentially of a crystalline ethylene-propylene-butene-1 random copolymer containing 1 to 5% by weight of gas-phased polymerization polymers having a molecular weight of up to 6000, 1 to 10% by weight of ethylene and 4 to 30% by weight of butene-1, each based on the weight of the copolymer, wherein said polypropylene composite stretched film has a heat sealing strength at 120° C. of 80 g/15 mm or more, and a haze percentage of 4% or less.

2. A polypropylene composite stretched film comprising a base layer consisting essentially of a crystalline polypropylene and a heat sealing layer consisting essentially of a crystalline ethylene-propylene random copolymer containing 1 to 5% by weight of gas-phased polymerization polymers having a molecular weight of up to 6000, 3 to 15% by weight of ethylene, each based on the weight of the copolymer, wherein said polypropylene composite stretched film has a heat sealing strength at 120° C. of 80 g/15 mm or more, and a haze percentage of 4% or less.

3. A polypropylene composite stretched film according to claim 1, wherein said ethylene-propylene-butene-1 random copolymer has an ethylene content of 2 to 6% by weight and a butene-1 content of 4 to 20% by weight.

4. A polypropylene composite stretched film according to claim 2, wherein said crystalline ethylene-propylene random copolymer has an ethylene content in the range of 5 to 11% by weight.

5. A polypropylene composite stretched film according to claim 1, wherein said crystalline ethylene-propylene-butene-1 random copolymer consists essentially of 1 to 4% by weight of gas-phased polymerization polymers having an average molecular weight of up to 6000.

6. A polypropylene composite stretched film according to claim 2, wherein said crystalline ethylene-propylene random copolymer consists essentially of 1 to 4% by weight of gas-phased polymerization polymers having an average molecular weight of up to 6000.

7. A polypropylene composite stretched film comprising (i) a base layer consisting essentially of a crystalline polypropylene and (ii) a heat sealing layer consisting essentially of a crystalline ethylene-propylene-butene-1 random copolymer containing 1 to 5% by weight of gas-phased polymerization polymers having a molecular weight of up to 6000, 1 to 10% by weight of ethylene and 4 to 30% by weight of butene-1, each based on the weight of the copolymer, wherein said polypropylene composite stretched film has a heat sealing strength at 120° C. of 80 g/15 mm or more, and a haze percentage of less than 3.5%.

8. A polypropylene composite stretched film comprising (i) a base layer consisting essentially of a crystalline polypropylene and (ii) a heat sealing layer consisting essentially of a crystalline ethylene-propylene random copolymer containing 1 to 5% by weight of gas-phased polymerization polymers having a molecular weight of up to 6000, and 3 to 15% by weight of ethylene, each based on the weight of the copolymer, wherein said polypropylene composite stretched film has a heat sealing strength at 120° C. of 80 g/15 mm or more, and a haze percentage of less than 3.5%.

* * * * *